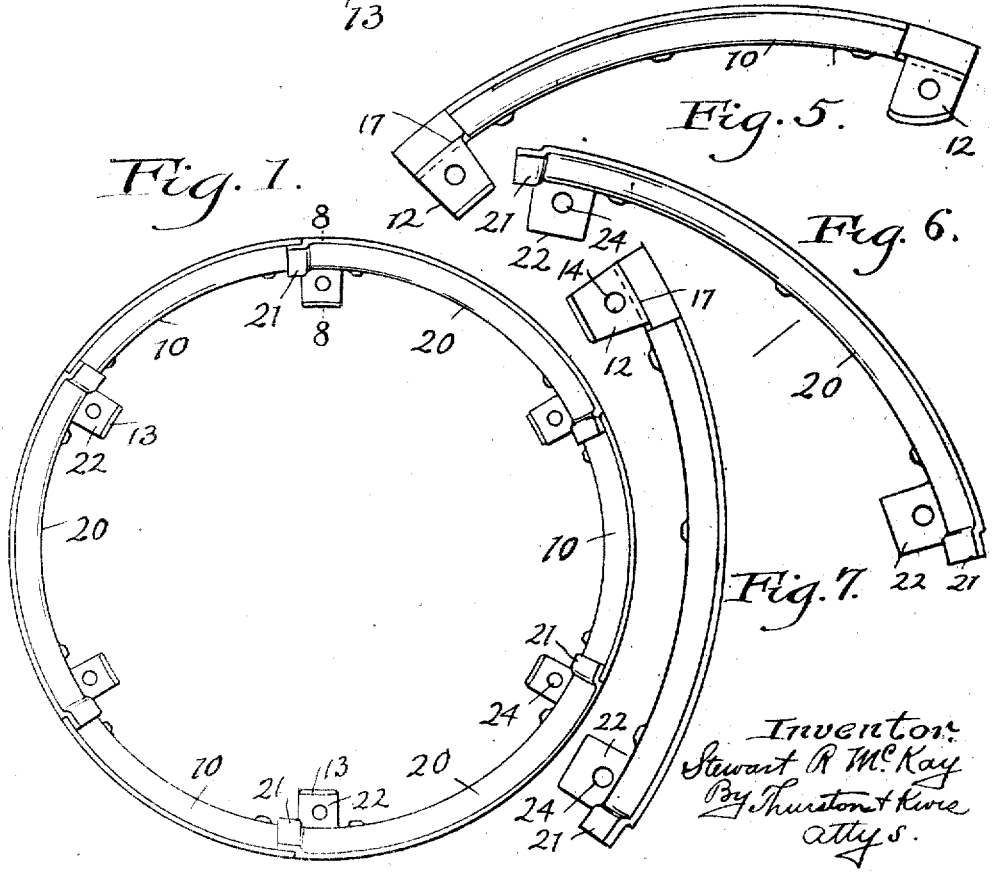

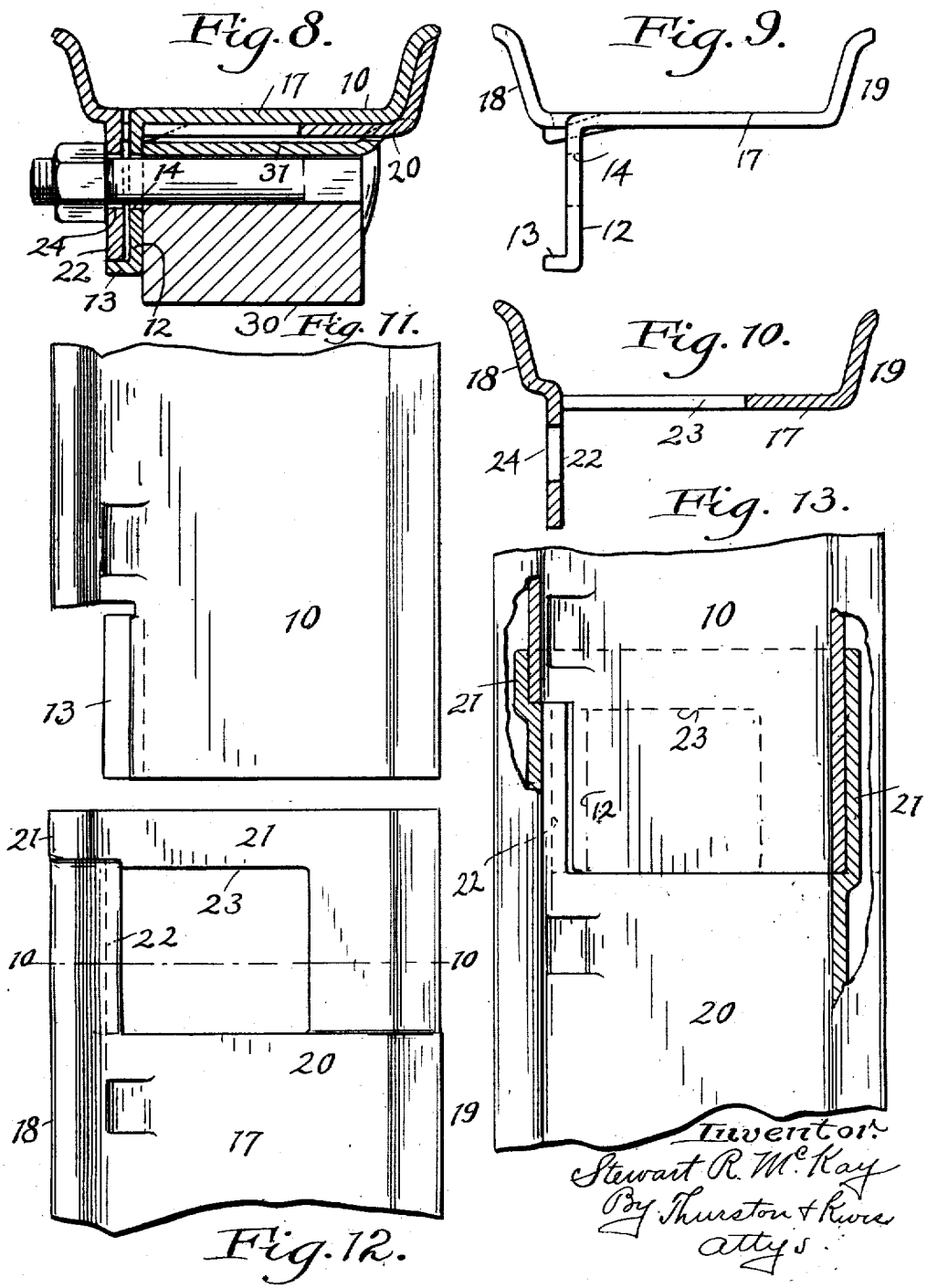

UNITED STATES PATENT OFFICE.

STEWART R. McKAY, OF CLEVELAND HEIGHTS, OHIO, ASSIGNOR TO THE McKAY COMPANY, OF CLEVELAND, OHIO, A CORPORATION OF OHIO.

DEMOUNTABLE RIM.

1,289,500.  Specification of Letters Patent.  Patented Dec. 31, 1918.

Application filed March 11, 1918. Serial No. 221,600.

*To all whom it may concern:*

Be it known that I, STEWART R. MCKAY, a citizen of the United States, residing at Cleveland Heights, in the county of Cuyahoga and State of Ohio, have invented a certain new and useful Improvement in Demountable Rims, of which the following is a full, clear, and exact description.

This invention is the outcome of efforts to produce a demountable tire holding rim more cheaply than any now in use can be produced.

A tire holding demountable rim which embodies all the characteristics of invention shown in the drawing, is composed of a plurality of segmental channeled sections, of such arcual length that they may be easily formed by the stamping process. These sections are formed with interlocking parts by which their relative position is assured and by means of which they may be separably locked together and likewise locked onto a wheel to which they are fitted.

It will be obvious, however, that many of the novel and useful characteristics of invention embodied in the rim as shown are capable of embodiment in a rim which is composed of two sections only,—regardless of how they are made, provided the ends of said sections are constructed for coöperation in substantially the manner disclosed.

The invention consists in the construction and combination of parts shown in the drawings and hereinafter described and definitely pointed out in the appended claims.

In the drawing, Figure 1 is an outside view of a wheel rim in which the present invention is embodied in its most satisfactory form; Fig. 2 is an outside view of the joint between two adjacent rim sections; Fig. 3 is an outside view of the inner section end; Fig. 4 is an outside view of an outside section end; Fig. 5 is a side elevation of one complete section having at either end an inside section end; Fig. 6 is an outside view of one complete section that has at each end an outside section end; Fig. 7 is an outside view of a section which at one end is formed with an inside section end, and at the other end with an outside section end; Fig. 8 is a radial section in the plane indicated by line 8—8 on Fig. 1 through the rim and the felly of a wheel to which the rim is fitted; Fig. 9 is an end view of one of the inside section ends; Fig. 10 is an end view of one of the outside section ends; Fig. 11 is a plan view of an inside section end; Fig. 12 is a plan view of an outside section end; and Fig. 13 is a plan view of adjacent connected ends of two sections.

A complete rim which embodies in the best and most practical form known to me, all of the invented characteristics of the rim shown, is composed of six segmental sections, of which three alternate sections 10 are like the sections shown in Fig. 5, and the three intermediate sections 20 are like the sections shown in Fig. 6. These sections are so short, and are otherwise so shaped that they may be formed from flat strips of suitable sheet metal between dies by the stamping process. Each of these sections has a substantially cylindrical base portion 17, and two outwardly extended side flanges 18 and 19, which construction produces what is hereinafter referred to as a segmental channeled rim section.

When these sections are arranged as shown, and secured together, with their ends overlapping, as will be presently explained, a complete annulus will be formed which has an external tire holding channel, and said overlapping ends are so shaped, as will be explained, that the inner walls of said channel are substantially continuous. The channel of a rim formed from the sections, constructed as shown, is designed for use with the so-called straight side pneumatic tire, but obviously the sections may be so shaped that the channel thereof will be adapted for tires of other shapes.

The sections 10 are of substantially the same cross sectional dimensions from end to end; but each section 20 at both ends thereof, is slightly belled as at 21—that is to say, is drawn or bent so as to enlarge the inner dimensions of the channel to such extent that the end of the adjacent section 10 will fit into the same, and the inner walls of the tire holding channel will be substantially continuous. For convenience the belled ends of sections will hereafter be referred to as outer section ends, while the section ends which fit into the same will be called inner section ends, for obvious reasons.

At each inner section end the outside flange 18 thereof is sheared transversely into the base, and the partially severed metal is then bent down to form a tongue 12, which, after being so bent, will be at substantially right angles to the base and parallel with the outer face of the wheel felly 30 on which the complete rim is to be secured. This tongue at its free end is formed with an outwardly extended flange 13; and the tongue also has a hole 14 for the reception of a laterally extended bolt 31 carried by the felly.

Close to the extreme end of each belled outer section end, a tongue 22 is pressed down from the base 17 thereof, thereby leaving a hole 23. When two adjacent sections are assembled as shown, the tongue 12 passes through this hole 23, and the sides of the tongue preferably engage the ends of the hole. The tongue 22 will lie outside of, and will be substantially parallel with the tongue 12, and the end of tongue 22 will properly shape to fit and will engage the flange 13 on tongue 12. The tongue 22 will likewise have a bolt hole 24 through it in alinement with the hole 14 in the tongue 12. When the parts have been so assembled, the overlapping end of the base part 17 of the inner section end will lie over and will cover the hole 23.

A rim made up of parts having substantially the described construction when assembled in the manner described, will hold its shape with a tire thereon, so that said rim and tire may be put onto and taken off of a wheel, if the rim is carefully handled. It is preferable, however, to have certain of the interlocking, overlapping section ends permanently secured together. Preferentially five of the sections are so permanently secured together by spot-welding their overlapping portions. The remaining section is preferably like section 20. The rim, therefore, when the sections are so connected, becomes in effect, a rim of two separable parts, namely, a long part composed of five sections permanently connected together, and a short part composed of sections like a section 20.

In order to put a tire onto the rim, the short section is disconnected from the long section. The long part of the rim may be then deformed sufficiently to permit the tire to be put onto it, and then said long rim section may be restored to its normal shape. Then the short section 20 may be introduced into the space between the ends of the long part. To do this may require a slight lateral twisting of the short removable rim section; but it can be easily done. As it is done the tongues 12 on the ends of the long rim member will pass through the holes 23 near the ends of the section 20, and the belled ends 21 of the latter will fit over the ends of the long rim member—which ends are shaped like the ends of the sections 10. When this section 20 has been so inserted into place to complete the rim, it is not liable to come out accidentally. Indeed, it takes considerable clever manipulation to displace it. The then completed rim with the tire thereon will then be put upon a wheel so that the laterally extended bolts 31 carried by the wheel felly 30 will each pass through the alined holes 14, 24, in the two overlapping tongues at each joint of the rim. The rim may carry a felly band 32 shaped to fit the interior of this rim, which will insure that the rim sections remain in the desired relation to one another. When nuts have been screwed onto the bolts 31, the rim is securely locked in place, and as shown; the same instrumentalities which interlock with one another to hold the rim sections together being employed to hold the rim upon the wheel.

Instead of fastening together five of these short sections and having one of the sections 20 removable, it is possible to fasten together four of said sections to form the major part of the rim, and to fasten together two of the sections to form the removable short part of the rim. In that event, one end of the large rim member would be belled at one end, while the other end thereof would be an inner section end. So with the short removable part of the rim, one end thereof would be shaped like an outer end section, while the other end would be shaped like an inner end section. From this it will be readily understood that instead of making the rim of sections 10 and 20, whereof both ends of the section 20 are outer section ends, the entire six sections might be made like the section shown in Fig. 7, that is to say, with an inner section end at one end thereof, and an outer section end at the other. In this event, five short sections might when their ends were properly interlocked, be permanently connected, and one short similar section might be separate therefrom.

Having described my invention, I claim:

1. A demountable wheel rim comprising a plurality of segmental channeled sections whose ends are overlapped and are formed with parts which interlock when the ends are overlapped, and means engaging said interlocking parts for fastening them on a wheel.

2. A demountable wheel rim comprising a plurality of segmental channeled sections whose ends are overlapped,—the outside overlapping parts of each section being formed with a hole, and a tongue which extends toward the axis of the wheel from one edge of said hole, and the inside overlapping part of each section having a tongue which passes through said hole in a line substantially parallel with the first named tongue,—said tongues being formed to be engaged by means for fastening the tongues and consequently the rim to a wheel.

3. A demountable rim made up of a plurality of segmental channeled sections of such length that they may be formed from flat sheet metal strips by the stamping process, said sections being formed with overlapping ends, the outer section at each joint being enlarged to such extent that the overlapping part of the inner section fits into said enlargement whereby the tire receiving channel of the produced rim has substantially continuous surfaces.

4. A demountable rim composed of a plurality of segmental channeled sections whose ends overlap and are formed with interlocking parts which hold the segmental sections in operative relation and which also serve as the means through which the rim is locked on the wheel.

5. A demountable rim composed of a plurality of connected segmental channeled sections having overlapping ends, the overlapping parts of both sections being formed with tongues which extend in parallel relations toward the center of the rim, and means adjacent each joint for engaging both tongues for locking the rim on a wheel.

6. A demountable rim composed of a plurality of connected segmental channeled sections having overlapping ends, at least one of said sections being separably connected with adjacent sections, and means provided on the overlapping parts of said removable section and adjacent sections for engagement with devices for locking the rim on the wheel.

7. A demountable rim composed of at least two separable connected segmental channeled sections having overlapping ends, the overlapping parts of both sections being provided with means adapted to be engaged by devices for locking the rim on a wheel.

8. A demountable rim composed of at least two separable connected segmental channeled sections having overlapping ends, the overlapping parts of both sections at each joint being formed with inwardly directed parallel tongues which have registering holes.

9. A demountable rim composed of at least two separable connected segmental channeled sections having overlapping ends, the overlapping parts of both sections at each joint being formed with inwardly directed parallel tongues which have registering holes, and the tongue attached to the inner section end being formed with a flange, and the end of the other tongue being formed to engage with and fit said flange.

In testimony whereof, I hereunto affix my signature.

STEWART R. McKAY.